United States Patent
Puryk et al.

(10) Patent No.: US 7,543,428 B1
(45) Date of Patent: Jun. 9, 2009

(54) SEAMLESS DRAPER BELT

(75) Inventors: Corwin M. Puryk, East Moline, IL (US); Bruce A. Coers, North Hillsdale, IL (US); Benjamin M. Lovett, Colona, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/164,667

(22) Filed: Jun. 30, 2008

(51) Int. Cl.
*A01D 57/26* (2006.01)
*G03G 5/00* (2006.01)

(52) U.S. Cl. ............................................ 56/1; 430/127
(58) Field of Classification Search ........................ 56/1, 56/14.3, 153, 364, 181, 177, 14.5; 198/844.2, 198/803.14, 803.15, 834, 835; 474/249, 474/253–257; 403/337, 338, 335, 24; 430/127
See application file for complete search history.

(56) References Cited

U.S. PATENT DOCUMENTS

| | | | | |
|---|---|---|---|---|
| 5,698,358 A | * | 12/1997 | Yu | 430/127 |
| 5,714,290 A | * | 2/1998 | Yu et al. | 430/56 |
| 6,238,131 B1 | * | 5/2001 | Watts et al. | 403/337 |
| 6,321,903 B1 | * | 11/2001 | Shaffer | 198/844.2 |
| 6,406,577 B1 | * | 6/2002 | Benedict et al. | 156/137 |
| 7,344,020 B2 | * | 3/2008 | Grywacheski et al. | 198/844.2 |

* cited by examiner

*Primary Examiner*—Robert E Pezzuto
(74) *Attorney, Agent, or Firm*—Taylor & Aust, P.C.

(57) ABSTRACT

A seamless draper belt formed from an elongated flat base structure of fabric and rubber. Transverse cleats having a structural core embedded in rubber are connected to the base. The elongated base structure and cleats are cured and adhere to one another except for end sections to form a flexible elongated structure, the ends of the base structure being overlapped and cured to form a seamless belt. An elongated guide is integrally formed on the base structure face opposite the face containing the cleats.

11 Claims, 4 Drawing Sheets

SEAMLESS DRAPER BELT

FIELD OF THE INVENTION

The invention relates to agricultural harvesting machines, and more particularly to draper belts incorporated in such machines.

BACKGROUND OF THE INVENTION

An agricultural combine is a large machine used to harvest a variety of crops from a field. During a harvesting operation, a header at the front of the combine cuts ripened crop from the field. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

Draper headers are header types commonly used when harvesting crops such as small grains, peas, lentils, and rice. Such draper headers comprise a cutter bar and two or more conveying transversely moving draper belts arranged in a forward direction behind the cutter bar that convey the cut crop towards the center of the header, where it is fed towards the rear by another conveyor belt assembly that feeds the crop towards a rear outlet of the header and to a feederhouse of the combine. During a harvesting operation with this header type, it is desirable to maintain a cutting height as low as possible to the ground in order to collect substantially the entire ripe crop from the field. To accomplish this, combines typically employ a header float system or a terrain following system to enable the header to follow the ground over changing terrain without gouging or digging into the soil.

One of the key elements in the transverse movement of cut crop material is the draper belt. A pair of draper belts are usually provided and are mounted on rollers and actuated to cause the movement of crop material towards the center section. Draper belts are subjected to tension fluctuations and reversals in bending causing localized stress which leads to a life that is limited by the joint between the ends of the belt.

It is standard practice to have a draper belt manufactured so that the ends are secured in situ on the draper header. The method of securing usually is with fasteners through a transverse end piece that meets to the adjacent end. However, there are sections of the belt that require a minimum clearance so as to require low profile fasteners in those sections. While current draper belts have significant reliability, their end sections usually are the limiting point of service life.

Accordingly, what is needed in the art is a draper belt having increased flexibility and durability, primarily in the area of the joint.

SUMMARY OF THE INVENTION

In one form the invention is a seamless draper belt formed from an elongated flat base structure of fabric and rubber. A plurality of transverse cleats having a structural core embedded in rubber are connected to the base. The elongated base structure and cleats are cured and adhere to one another except for end sections to form a flexible elongated structure, the ends of the base structure being overlapped and cured to form a seamless belt.

In another form the invention is a method of making a seamless draper belt including the steps of forming an elongated flat base structure of fabric and uncured rubber and having a first and second end. Cleats formed from a structural core embedded in uncured rubber are positioned on one face of the base structure. The molding and curing of the rubber over the cleat cores and adjacent base structure is done leaving a portion of the base structure adjacent the first and second ends being uncured. The uncured ends are then overlapped and cured to form an endless seamless draper belt.

DETAILED DESCRIPTION OF THE INVENTION

Figure 1:
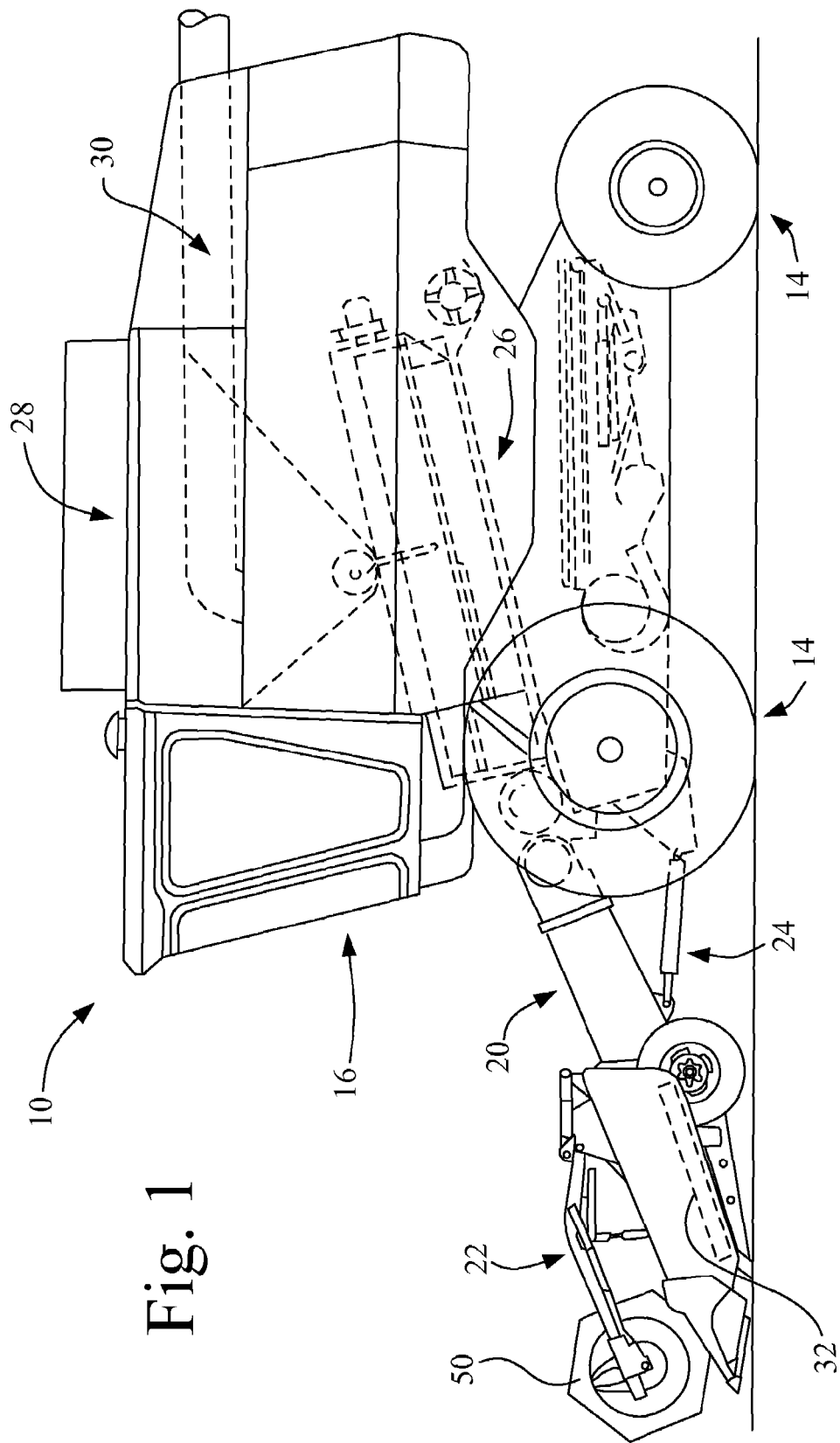
FIG. 1 is a side-view of a combine, showing a draper platform header.

FIG. 1 illustrates a self-propelled combine 10 commonly used in a grain farming operation to harvest a variety of crops from a field. An onboard engine (not shown) powers the combine 10, while ground engaging wheels 14 support and propel the machine. An operator controls the combine 10 from an operator's station located in a cab 16 at the front of the machine.

A feederhouse 20 pivotally attaches at the front of the combine 10, supporting a header 22 removably attached to the front of the feederhouse 20. A pair of lift cylinders 24 support and articulate the feederhouse 20 from the combine 10, enabling the raising and lowering of the header 22 relative to the ground.

During a harvesting operation, the combine 10 moves forward through the field with the header 22 lowered to a working height. The header 22 cuts and transfers crop material to the feederhouse 20, which in turn transfers the crop material into the combine 10. Once inside the combine, threshing and separating assemblies 26 remove grain from the non-grain crop material and transfer it to a grain tank 28 for temporary holding. Crop material other than grain exits from the rear of the combine 10. An unloading auger 30 transfers the grain from the grain tank 28 to a truck or grain cart for transport, or to another receiving bin for holding. In the following, all references to directions are quoted with respect to the forward direction of combine 10 which extends in FIG. 1 to the left side.

Figure 2:
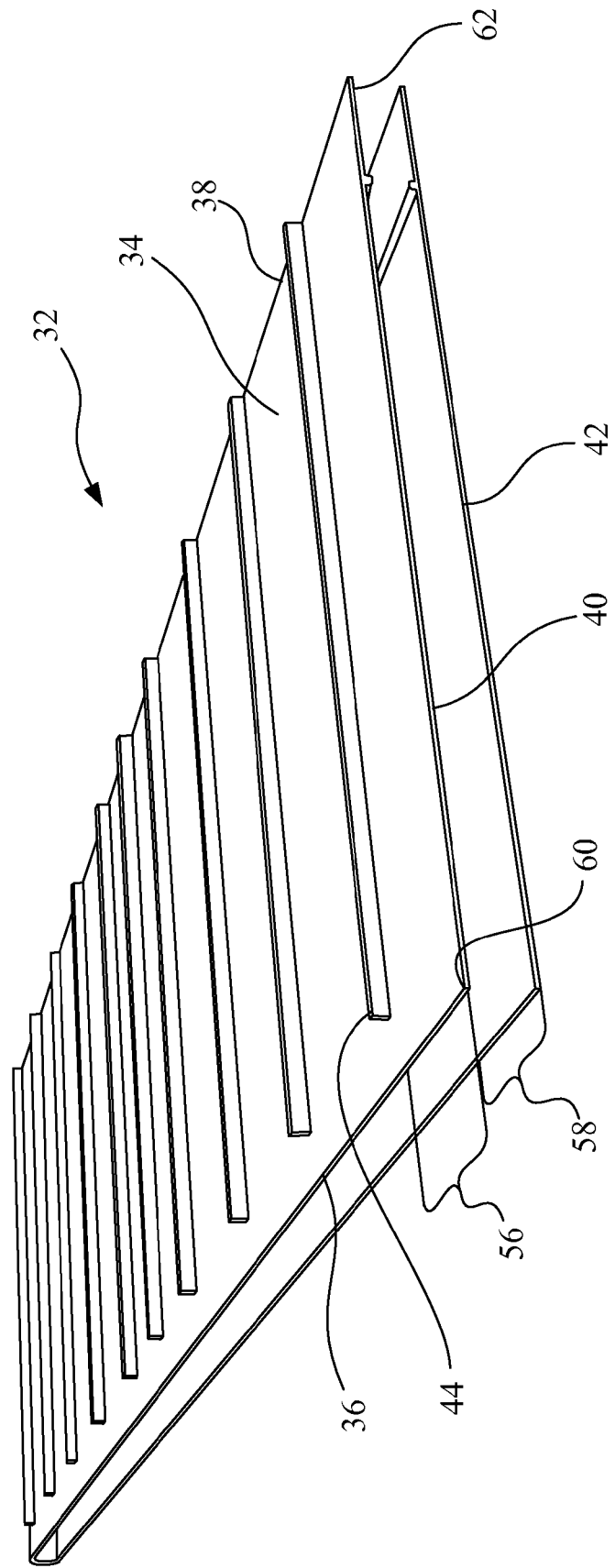
FIG. 2 is a perspective view of a belt embodying the present invention.
Figure 3:
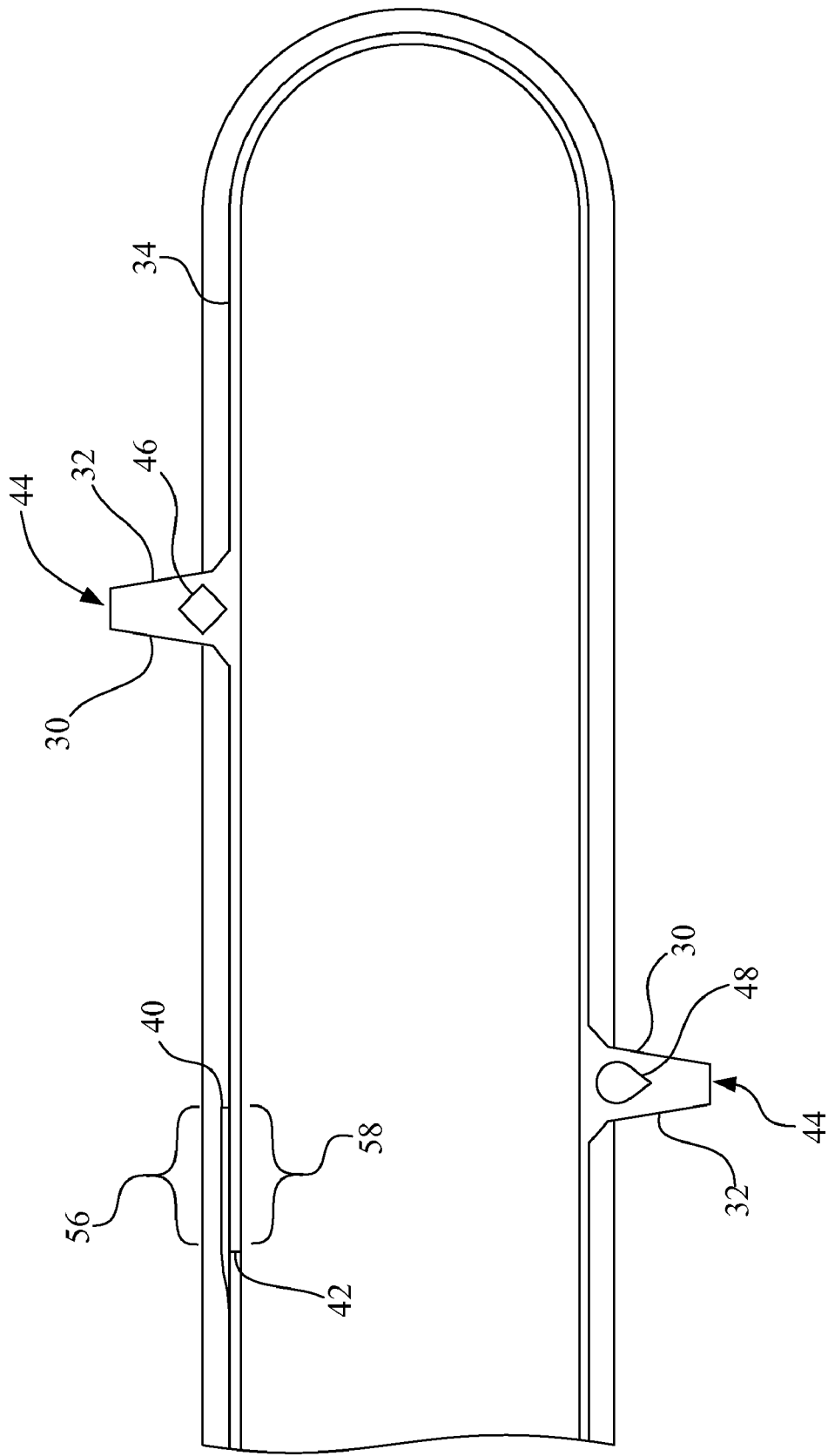
FIG. 3 is a side view of the belt shown in FIG. 2.

An essential element of the header is a draper belt 32 that transfers cut crop material laterally inward to the feederhouse 20. Typically, a pair of draper belts 32 is provided to transfer cut crop material laterally to the central location of the feederhouse 20. Referring now to FIG. 2, there is shown the draper belt 32 which is used to carry crop material towards the feederhouse 20 and which is positioned over guides and rollers (not shown) to simplify the understanding of the present invention. The draper belt 32 comprises an elongated base structure 34 having side edges 36, 38 and ends 40, 42. The base structure 34 is formed from fabric calendared with rubber and cured or vulcanized in a standard curing process in the industry. The base structure 34 has a plurality of cleats 44 extending laterally from adjacent one edge 36 to adjacent the other edge 38. As shown particularly in FIG. 3, the cleats 44 have an elongated structural core 46 or 48 to provide sufficient rigidity to the cleat 44. The structural core 46 is diamond shape in cross-section and the core 48 has alternatively a tear drop cross-section shape with the widest section adjacent the base 34. It should be apparent to those skilled in the art that other cross-section shapes may also be employed. The cores 46, 48 are embedded in rubber 28 having tapered working surfaces 30 and 32 with the widest portion of the cleat being adjacent the base material 12.

Figure 4:
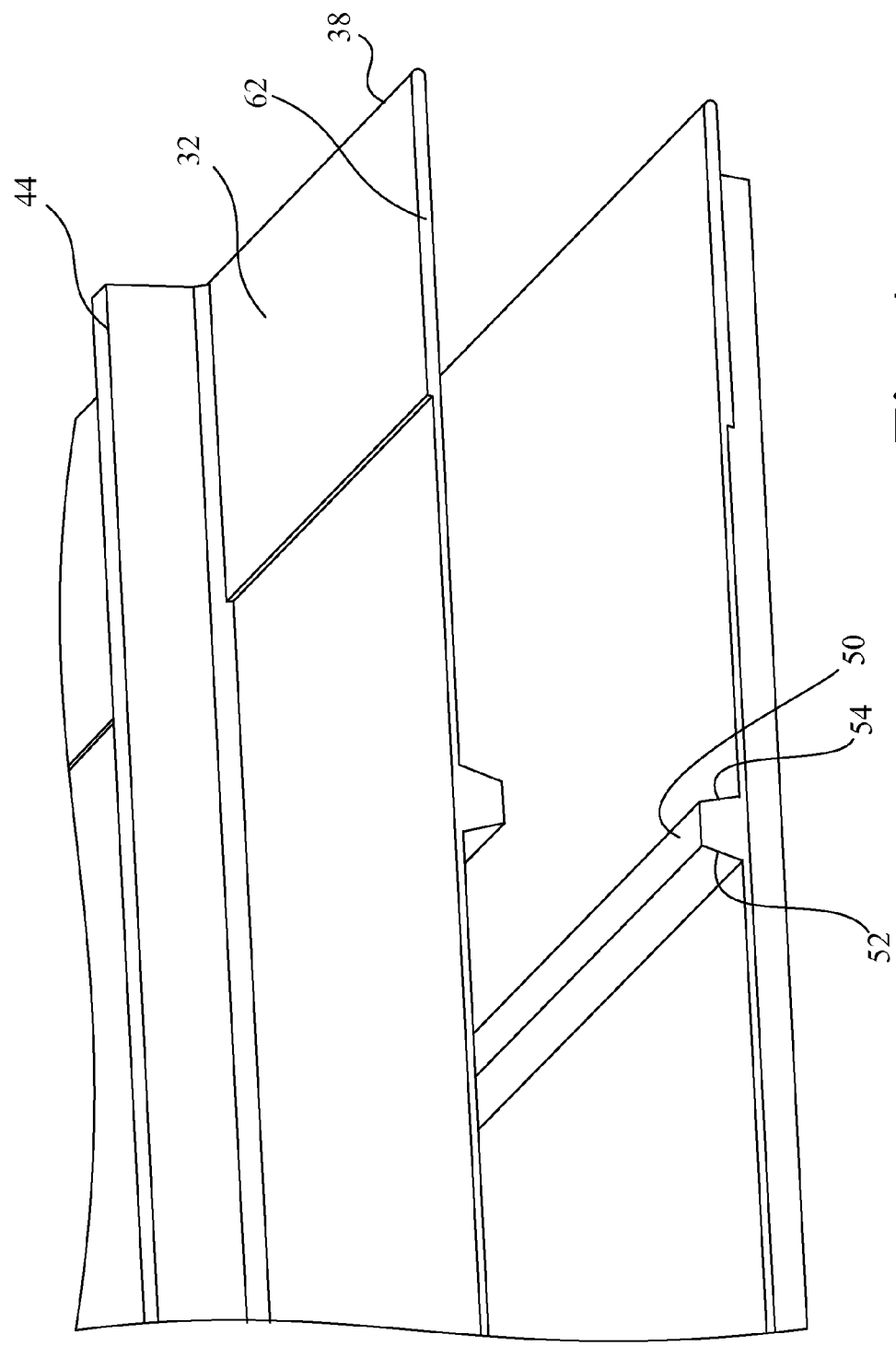
FIG. 4 is an enlarged portion of the perspective view of FIG. 3.

The draper belt 32 additionally has a guide 50 opposite the face of base 34 containing the cleats 38. The guide 50 is shown in detail in FIG. 4. Guide 50 is elongated extending in a direction substantially parallel to the longitudinal axis of the base structure 34 and having tapered faces 52 and 54. The guide 50 is tended to align the draper belt 32 so that it remains in a predetermined forward and aft position. The guide 50 is formed from the same rubber material in base 34 so that during curing or vulcanization it forms an integral flexible structural element.

The belt 32 is manufactured by first providing the elongated base 34 having the first end 40 and the second end 42 with the rubber in an uncured state.

The cleats 44 are formed from extrusions or molds of uncured rubber to the resultant tapered shape around the structural core 46 or 48. These elements are placed in a mold along the top surface along one face of the structure 34 and are uniformly spaced from and parallel to each other. At the same time the uncured rubber is applied to form the guide 50. In typical fashion the belt 32 is formed in sequenced sections from adjacent the first end 40 to the second end 42 of the base structure 34. The elements of the combination are cured except for a portion 56 and 58 adjacent ends 40 and 42, respectively of the base structure 34. The guide 50 is also interrupted over section 56 and 58. As an alternative, the side edges 36 and 38 can be folded over on themselves at 60 and 62 before curing to reinforce the side edges. The sections 56 and 58 containing the folded over edges are not yet cured. Alternatively, separate uncured rubber strips may be placed along the side edges 36 and 38 to form a re-enforcing hem, Once the composite structure has been cured, the end sections 56 and 58 are overlapped as shown particularly in FIG. 3 and that section cured to perform a seamless integral structure forming an endless draper belt. While a range of overlapping dimensions may be employed, an overlap of approximately 6 inches may be used.

By eliminating mechanical joints in the belt 32, extended durability is enhanced. It should be noted that the securing of the end sections in the fashion shown presents an extremely low profile without the height limitations of prior art draper belts that are assembled in the field.

Having described the preferred embodiment, it will become apparent that various modifications can be made without departing from the scope of the invention as defined in the accompanying claims.

The invention claimed is:

1. A method of making a seamless draper belt comprising the steps of:
    forming an elongated flat base structure of fabric and uncured rubber, having a first and second end;
    positioning to said base structure on one face thereof a plurality of transverse cleats formed from a structural core embedded in uncured rubber;
    molding and curing rubber over said cleat cores and adjacent base structure, a portion of the base structure adjacent the first and second ends being uncured; and
    overlapping and curing said first and second ends to form an endless seamless draper belt.

2. The method of claim 1, wherein the cleats are positioned on the base structure at a uniformly spaced location.

3. The method as claimed in claim 1, wherein the structural core is diamond shaped in cross-section.

4. The method as claimed in claim 1, wherein the structural core has a tear drop cross section shape with the widest portion adjacent the elongated flat base structure.

5. The method as claimed in claim 1, wherein the cleats are formed into a tapered cross-section with the widest portion of the cleat adjacent the elongated flat base structure.

6. The method as claimed in claim 1, comprising the further step of forming an elongated guide from rubber simultaneously with the molding and curing of rubber over the cleat cores and adjacent base structure.

7. The method as claimed in claim 6, wherein the elongated guide has a tapered cross-section with the widest portion adjacent the elongated flat base structure.

8. The method as claimed in claim 6, wherein the guide is formed except at the ends where the elongated base structure is overlapped.

9. The method as claimed in claim 1, wherein the first and second ends are overlapped approximately six inches.

10. The method as claimed in claim 1, comprising the further steps of the elongated flat base structure being overlapped along the side edges prior to curing the entire structure.

11. The method as claimed in claim 1, comprising the further steps of the elongated flat base structure being overlapped along the side edges by separate uncured strips prior to curing the entire structure.

\* \* \* \* \*